United States Patent Office 3,183,225
Patented May 11, 1965

3,183,225
WATER SOLUBLE UREA OBTAINED BY CONDENSING PHOSGENE WITH AN AZO DYE
Paul Dreyfuss, Basel, Switzerland, assignor to Ciba States Limited, New York, N.Y.
No Drawing. Filed July 7, 1960, Ser. No. 41,267
Claims priority, application Switzerland, July 9, 1959, 75,531
9 Claims. (Cl. 260—167)

The present invention provides new dyes, more especially for use in color-photographic materials, as well as a process for the manufacture of said dyes. A special sphere of application of these dyes is the production of photographic images in colors by the silver dye bleach process.

It is known to produce monochromatic or polychromatic photographic images with the aid of the silver dye bleach process which is based on the destruction of dyes according to the image. This process consists in first producing by usual exposure and development a conventional photographic silver image in a photosensitive layer which is homogeneously dyed with a dye. The dye contained in the layer is then destroyed in a silver dye bleaching bath in each section of the image according to the amount of image silver present in it. The silver is then removed and a dye image is obtained which is the opposite of the initial silver image. As in the case of the known multi-layer materials for color development, it is of advantage also in the silver dye bleach process for the production of multi-colored photographs to use a material which in general consists of three component layers that are each sensitive to a certain spectral range. For example, a preferred multi-layer material is composed of a base on which there is produced a first red-sensitive layer, containing a cyan dye, on top of which there is a second layer dyed with a purple (magenta) dye and sensitized to green, and on top of the latter there is a third yellow filter layer which eliminates the disturbing short-wave rays (with respect to sensitivity of the two layers underneath it), and the topmost layer is a non-sensitized, that is to say a blue-sensitive, layer containing a yellow dye.

The dyes used in photographic material processed by the silver dye bleach process must satisfy an extremely varied range of requirements. Apart from having to be easy to bleach out as is needed for the silver dye bleach process, such dyes must be readily soluble in water; they must not tend to diffuse in gelatine or other film-forming colloids; and they must not have an adverse effect on the photographic properties of the silver halide emulsion in which they are incorporated. They must be fast to light and possess pure tints.

As has been mentioned hereinbefore, the present invention provides new dyes that are particularly suitable for use in the silver dye bleach process. These new dyes are acyl derivatives of azo dyes of the formula (1)
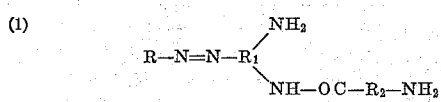

in which R represents the radical of a diazo component and $R_1$ and $R_2$ each represent a benzene radical, and in the radical $R_1$ the group —$NH_2$ and —NH—OC— are in meta-position relatively to each other.

The new acyl derivatives are obtained according to the present invention by acylating azo dyes of the Formula 1.

The parent dyes of the Formula 1 can be manufactured by coupling a diazo compound with a coupling component of the formula (2)
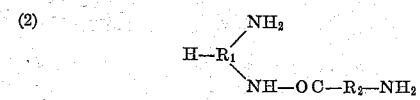

in which $R_1$ and $R_2$ have the above meaning. The dyes contain advantageously at least one group imparting solubility in water, for example a carboxyl group or above all a sulfonic acid group. In this case the starting materials are selected so that at least one of them contains at least one such group.

Preferred diazo components for the manufacture of the parent dyes are amines of the benzene or naphthalene series, for example compounds of the formula (3)        R—$NH_2$ in which R stands for a benzene radical which may contain substituents such as chlorine atoms, methyl groups, methoxy groups and/or the aforementioned solubilizing groups, preferably sulfonic acid groups.

Particularly valuable dyes, distinguished by their pure yellow tints, can be prepared from diazo components of the Formula 3 in which R represents a radical of a benzoylamino-arylsulfonic acid linked at the benzene ring of the benzoyl radical direct with the diazotizable amino group. Such diazo components correspond, for example, to the formula (4)        $R_3$—NH—OC—$R_4$—$NH_2$ in which $R_3$ represents a benzene or naphthalene radical which preferably contains sulfonic acid groups, and $R_4$ represents a benzene radical, the groups —NH—OC— and —$NH_2$ being in meta-position or para-position relatively to each other. Accordingly, such diazo components may correspond to the formula (5)
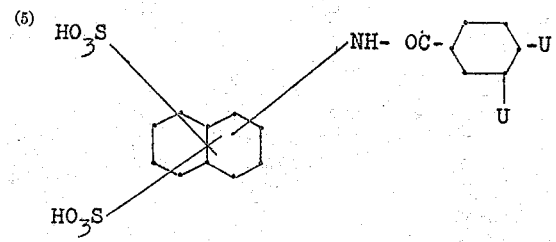

or to the formula (6)
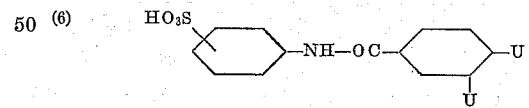

in which one U stands for a hydrogen atom and the other U for an $H_2N$— group.

Instead of using a diazo compound of a monamine for the manufacture of the parent dyes of the Formula 1, there may be used tetrazo compounds of diamines, in which case dyes are obtained that correspond to the formula (7)        $R_6$—N=N—$R_5$—N=N—$R_7$ in which $R_5$ represents the radical of a tetrazotizable diamine and $R_6$ and $R_7$ each represent a radical of a coupling component, and at least $R_6$ or $R_7$, or preferably both, correspond to the formula (7a)
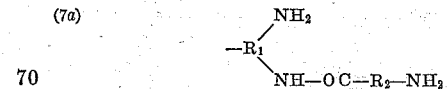

in which $R_1$ and $R_2$ have the above meaning.

In making the disazo dyes it is of special advantage to use at least one starting component that contains a sulfonic acid group, i.e. coupling, for example, a tetrazo compound containing sulfonic acid groups with a coupling component that is free from such groups, or vice versa. Alternatively, a tetrazo compound that is free from sulfonic acid groups can be coupled with a coupling component that is likewise free from such groups, the resulting dye then being sulfonated.

Suitable tetrazotizable amines are, for example, benzidine compounds. Likewise suitable are diamines of the formula (8) 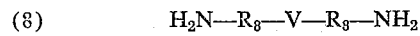 $H_2N—R_8—V—R_8—NH_2$ in which $R_8$ represents a monocyclic benzene radical and V a hydrocarbon radical, both radicals $R_8$ being linked to the same carbon atom of the hydrocarbon radical V. The benzene radicals $R_8$ may be substituted, for example by methyl or methoxy groups. The hydrocarbon radical V contains preferably a six-membered ring, for example a cyclohexane or benzene ring and may correspond in the latter case to the formula (9) 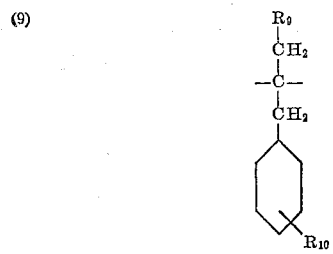

in which $R_9$ and $R_{10}$ represent hydrogen atoms or hydrocarbon radicals, such as methyl groups. These diamines can be made by known methods by reacting a ketone with an aminobenzene.

As examples of diazotizable and tetrazotizable amines there may be mentioned the following compounds:

1-amino-3-chlorobenzene,
1-amino-3:4-dichlorobenzene,
1-aminonaphthalene,
1-amino-3- or -4-sulfonic acid,
1-aminobenzene-2:5-disulfonic acid,
1-aminobenzene-5-chlorobenzene-2-sulfonic acid,
1-aminobenzene-3-methylbenzene-4-sulfonic acid,
1-aminobenzene-2-methoxybenzene-5-sulfonic acid,
1-aminobenzene-4-hydroxybenzene-3-carboxylic acid-5-sulfonic acid,
2-(4'-aminophenyl)-6-methylbenzthiazole-sulfonic acid,
3'-aminobenzoylaminobenzene,
1-(3'-aminobenzoylamino)-benzene-6-sulfonic acid,
1-(4'-aminobenzoylamino)-benzene-4-sulfonic acid,
2-(4'-aminobenzoylamino)-naphthalene-6:8-disulfonic acid,
2-(3'-aminobenzoylamino)-naphthalene-4:8-disulfonic acid,
1-(3'-aminobenzoylamino)-naphthalene-3:6-disulfonic acid,
4:4'-diaminodiphenyl,
3:3'-dimethyl-4:4'-diaminodiphenyl,
4:4'-diaminodiphenyl-2:2'-disulfonic acid,
1-benzyl-1:1-di(4'-aminophenyl)-ethane, and
1:1-bis-(3'-methyl-4'-aminophenyl)-cyclohexane.

The compounds of the Formula 2, used as coupling components for the manufacture of the parent dyes of the Formula 1, are obtained by acylating a 1-amino-3-nitrobenzene which is at most substituted in position 4 or 6, with a halide of a nitrobenzoic acid, followed by reduction of the dinitro compound so formed. Suitable 1-amino-3-nitrobenzenes are, for example, 1-amino-3-nitrobenzene, 1-amino-3-nitro-4-chlorobenzene, 1-amino-3-intro-4-methylbenzene, 1-amino-2-methyl-3-nitrobenzene and 1-amino-3-nitrozenzene-4-carboxylic acid.

Particularly suitable halides of nitrobenzoic acids are 3- and 4-nitrobenzoyl chloride and 3-methyl-4-nitrobenzoyl chloride.

Instead of a 1-amino-3-nitrobenzene, a corresponding 1:3-diaminobenzene can be acylated with the nitrobenzoyl halide, provided a monoacylation is possible; this is the case, for example, with 1:3-diamonbenzene 4-sulfonic acid.

Preferred coupling components are those of the formula

(10) 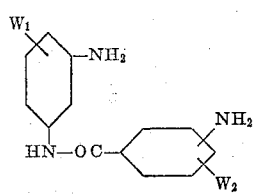

in which $W_1$ and $W_2$ each represent a hydrogen atom or a substituent. The substituent $W_1$ may be, for example, a methyl or sulfonic acid group, while the substituent $W_2$ may be, for example, a methyl group. The amino group of the aminobenzoyl radical is advantageously in the meta- or para-position relatively to the —CO— group. There are especially suitable coupling components of the formula

(11) 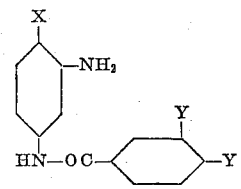

in which X represents a hydrogen atom or a sulfonic acid group, one Y stands for a hydrogen atom and the other Y for an $H_2N—$ group.

When X represents a sulfonic acid group, the coupling of the diazo compound with the coupling component of the Formula 11 does not always proceed satisfactorily, but it can be rendered easier by coupling the coupling component in the form of an ω-methanesulfonic acid therefor (obtained by reacting formaldehyde with an alkali metal bisulfite), followed by elimination of the ω-methanesulfonic acid group.

According to the invention the aminoazo dyes of the Formula 1 are acylated with the use as acylating agent of a reactive derivative, for example a halide or anhydride, of a monobasic or polybasic (preferably a dibasic) carboxylic acid. Suitable acylating agents are, for example:

Acetic anhydride,
Caproyl chloride,
Lauroyl chloride,
Phenylisocyanate,
Phosgene (dichloride of carbonic acid),
Fumaric acid dichloride,
Terephthalic acid dichloride,
Cyanuric chloride (trichloride of cyanuric acid).

When acylating the diaminoazo dyes of the Formula 1 it is by no means always necessary to acylate all amino groups present. More especially, by acylation with an acid dichloride such as phosgene there are obtained dyes in which at least two molecules of the monoazo dye are connected by bridges (for example —CO—), and there may also remain amino groups that are not connected by bridges. The products formed by acylation with an acid dichloride are probably not unitary. Thus it may be assumed that the urea formation caused by phosgene does not take place exclusively between an amino group each linked to $R_1$ and $R_2$, and combinations of specularly symmetrical ureas may be formed. Depending on the degree of acylation molecules of different chain lengths are probably formed. Of practical significance is only the fact that acylation, for example with phosgene, gives rise to dyes that are readily soluble in water, do not diffuse out of a gelatine layer, into the vicinity of the latter, are of clear tints, and are easy to bleach in the conventional bleaching baths in the presence of a silver image. This poses the rule that the acylation need be taken only to the point necessary for the formation of a dye that does not diffuse.

The dyes of the invention are as a rule of a lemon-yellow to orange tint, and they may be applied with a gelatine-silver halide emulsion or with a silver halide emulsion in another colloid; they may be incorporated in droplets of a high-boiling cristalloid material; they may be cast in unilayer or multi-layer materials; or in multi-layer materials they may be incorporated in an emulsion layer or they may be used in a layer adjacent to an emulsion layer. They may also be used as filter dyes in layers containing colloidal silver or a fogged emulsion.

Thus, the invention also includes the use of the dye described above in material to be used in color photography, more especially such as is worked up by the silver bleach process, as well as color photographs obtained by said process.

Unless otherwise indicated, parts and percentages in the following examples are by weight.

*Example 1*

173 parts of 1-aminobenzene-3-sulfonic acid are diazotized and coupled with 227 parts of 1-amino-3-(3'-aminobenzoylamino)-benzene. The dye so formed is salted out, filtered off, dissolved in water and treated at room temperature with phosgene, while keeping the reaction mixture constantly neutral by adding sodium carbonate. On completion of the phosgenation the reaction mixture is allowed to turn acidic, the dye precipitated in brown flocks is filtered off and thoroughly washed with water. The residue is digested with sodium carbonate solution of 2% strength; a small amount of a dye which diffuse in gelatine passes into solution, while the main product does not dissolve owing to the salting-out effect of sodium carbonate. The residue is dried; it forms a brown powder which readily gives an aqueous solution of pure yellow color.

*Example 2*

Diazotized 2-(3'-aminobenzoylamino)-naphthalene-4:8-disulfonic acid is coupled with 1-amino-3-(4'-aminobenzoylamino)-benzene. The aforementioned diazo component is prepared from 2-aminonaphthalene-4:8-disulfonic acid by acylating it with meta-nitrobenzoyl chloride, followed by reduction with iron and acetic acid. The resulting dye of the formula

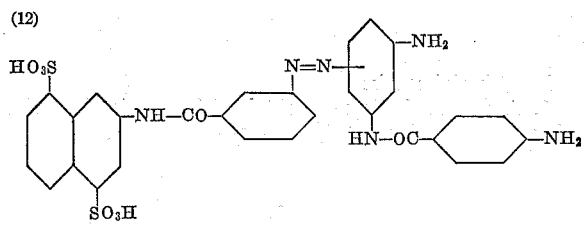

is dissolved in water and treated with phosgene, while keeping the reaction mixture neutral to weakly alkaline with sodium carbonate. The phosgenation is continued until the dye no longer diffuse when subjected to the test described in Example 5. In the form of its sodium salt the dye obtained in this manner dissolves readily in water and colors gelatine a pure pale-yellow tint.

*Example 3*

1-benzyl-1:1-di-(4'-aminophenyl)-ethane is tetrazotized and the tetrazo compound is coupled on both sides in aqueous pyridine with 1-amino-3-(3'-aminobenzoylamino)-benzene-6-sulfonic acid. A diazoamino compound is formed which is rearranged into an azo dye by being stirred for 24 hours at 40° C.; it corresponds to the formula

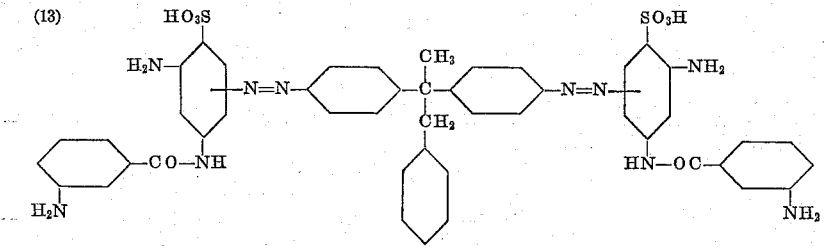

The solution is heated to 80° C. and the dye is precipitated with hydrochloric acid, filtered off, converted into its sodium salt and purified by reprecipitation. The dye gives a very pure yellow solution in water. By acetylation it is converted into a similar dyestuff which is faster to light and diffuses very little. The urea obtained by reaction with phosgene is of the same color, readily soluble in water, completely fast to diffusion and easy to bleach in the presence of metallic silver. By acylation with terephthalic acid dichloride a yellow, slightly more reddish dye of otherwise similar properties is obtained.

1-benzyl-1:1-di-(4'-aminophenyl)-ethane is obtained by condensation of aniline and benzylmethyl ketone and forms on recrystallization from benzene colorless crystals melting at 149° C. (see also last paragraph of Example 7).

*Example 4*

By diazotizing 2-(3'-aminobenzoylamino)-naphthalene-4:8-disulfonic acid and coupling with 1-amino-3-(4'-aminobenzoylamino)-benzene-6-sulfonic acid a dye of the following formula is obtained

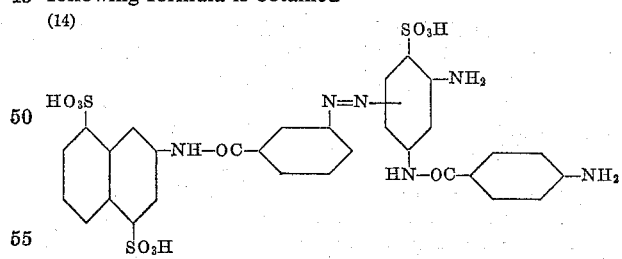

which is treated in a weakly alkaline solution exhaustively with phosgene and then isolated in the form of its sodium salt. The dye is sufficiently fast to diffusion in gelatine layers for practical purposes, it has a very pure yellow tint and can be bleached completely colorless in the presence of a silver image.

*Example 5*

An aqueous solution of 3% strength of the dye prepared as described in Example 1 is mixed with a gelatine solution and brushed over a plate of glass primed with gelatine. A pure yellow layer is obtained which can be treated in an alkaline aqueous bath without the dye bleeding into the bath. The outer gelatine layer can be peeled off the glass plate, whereupon the prime coat remains behind as a colorless coating.

*Example 6*

A silver bromide gelatine emulsion is dyed with the dye prepared according to Example 1 and poured over a plate of glass so that the cast layer has an optical density, D=2.0, measured through a Wratten filter No. 39. The plate is exposed with blue light under a stepped wedge and then developed. When the dyed plate is compared with an undyed emulsion plate, the former displays a relative drop in sensitivity of 0.8 (log). The plate is hardened and treated in a bleaching bath containing hydrochloric acid, sodium chloride, thiourea and di-aminophenazine, whereby it is bleached pure white in such zones as contained metallic silver.

*Example 7*

The following layers are cast in the indicated order, one on top of the other, on a cellulose acetate film:

(1) A red-sensitized silver bromide emulsion containing the cyan dye of the formula

(15)
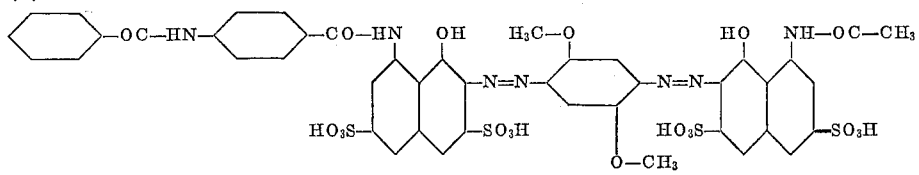

(2) A green-sensitized silver bromide emulsion containing the purple dye of the formula

(16)
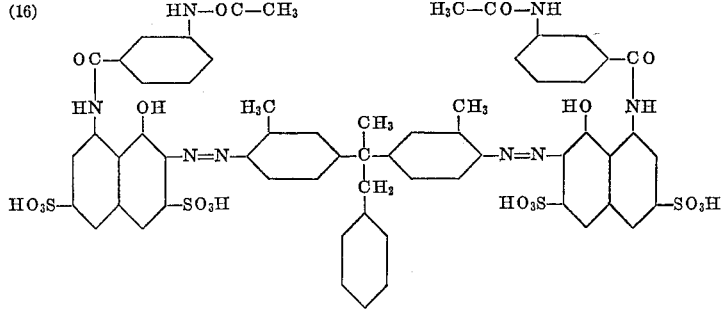

(3) A yellow filter layer formed by colloidal silver containing an amonut equivalent to that of the colloidal silver of the dye of the invention described in Example 1.

(4) A non-sensitized silver bromide emulsion dyed with the yellow dye of the invention prepared as described in Example 1.

The film made in this manner is processed by a conventional method according to the silver dye bleach process. The film has in all its component layers a sensitivity sufficient for the usual lighting conditions. The film is exposed, for example, under a positive color master, developed in a methol-hydroquinone developer, fixed and then bleached in a dye bleaching bath prepared from hydrochloric acid, thiourea and amino-hydroxyphenazine. After having removed the excess silver in a Farmer's reducer a print in natural color is obtained.

The dye of Formula 15 can be prepared in the following manner:

198 parts of 1-amino-2:5-dimethoxy-4-nitrobenzene are diazotized in a hydrochloric suspension and the diazo compound is coupled with 361 parts of 1-acetylamino-8-hydroxynaphthalene-3:6-disulfonic acid. The resulting nitromonoazo dye is reduced in an alkaline medium with sodium sulfide to form the aminomonoazo dye which is purified by reprecipitation and then diazotized; the diazo compound is coupled in a mixture of pyridine and aqueous ammonia with 542 parts of 1-(4-benzoylaminobenzoylamino)-8-hydroxynaphthalene-3:6-disulfonic acid. The resulting disazo dye is freed from violet impurities by repeated reprecipitation. It dyes gelatine a pure bluish green tint.

The dye of Formula 16 can be prepared in the following manner:

165 parts of 1-benzyl-1:1-di(3'-methyl-4'-aminophenyl)-ethane are tetrazotized in the usual manner in a hydrochloric solution and coupled with 480 parts of 1-(3'-acetylaminobenzoylamino)-8-hydroxynaphthalene-3:6-disulfonic acid in a solution rendered alkaline with sodium carbonate. The purple dye formed in this manner is filtered off and purified in the usual manner. In the form of its free acid it corresponds to the Formula 16. It is readily soluble in water, does not diffuse in gelatine, is of considerable brilliance, readily compatible with a halide emulsion, can be bleached pure white and has good fastness to light.

1-benzyl-1:1-di-(3'-methyl-4'-aminophenyl)-ethane used as starting material can be prepared in the following manner:

A mixture of 320 parts of 1-amino-2-methylbenzene, 300 parts by volume of concentrated hydrochloric acid and 134 parts of phenylacetone is stirred and the temperature is raised within 4 hours from 60 to 110° C. The reaction mixture is then distilled while raising the temperature to 140° C., whereupon water and oil settle out in the receptacle. The oil is separated and returned to the reaction vessel. The mixture is stirred for about 8 hours longer at 140° C. under reflux, then taken up in water, rendered strongly alkaline with sodium hydroxide solution, and the separated oil is subjected to steam distillation to recover the excess 1-amino-2-methylbenzene. The oily residue remaining in the distillation vessel is dried and recrystallized from cyclohexane. Yield: about 106 parts of colorless crystals soluble in dilute hydrochloric acid, melting at 110° C., whose properties and analysis correspond to the formula

(17)
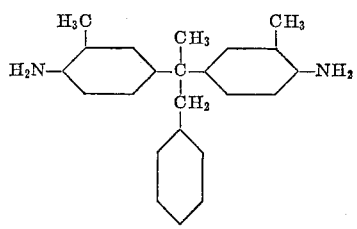

What is claimed is:

1. A water-soluble urea obtained by condensing with phosgene an amino azo dyestuff of the formula $$R-N=N-R_1 \begin{array}{c} NH_2 \\ NH-OC-R_2-NH_2 \end{array}$$

in which R is a member selected from the group consisting of the radical of a benzene diazo component and a naphthalene diazo component, $R_1$ is a member selected from the group consisting of phenyl and sulfophenyl, and $R_2$ is phenyl, and in the radical $R_1$ the groups —$NH_2$ and —NH—OC— are in meta-position to one another.

2. A water-soluble urea obtained by condensing with phosgene an amino azo dyestuff of the formula

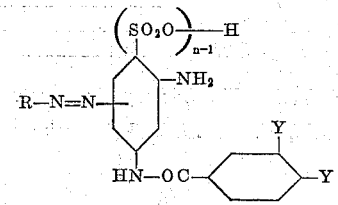

in which R is a member selected from the group consisting of the radical of a benzene diazo component and a naphthalene diazo component, one Y represents a hydrogen atom and the other Y represents an $H_2N$— group and $n$ represents a whole number of at the most 2.

3. A water-soluble urea obtained by condensing with phosgene an amino azo dyestuff of the formula

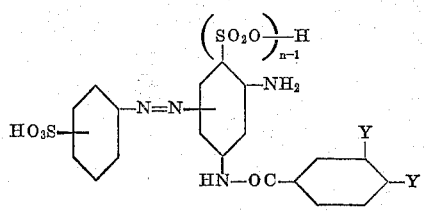

in which one Y represents a hydrogen atom and the other Y represents an $H_2N$— group and $n$ represents a whole number of at the most 2.

in which one Y represents a hydrogen atom and the other Y represents an $H_2N$— group and $n$ represents a whole number of at the most 2.

5. A water-soluble urea obtained by condensing with phosgene the aminoazo dyestuff of the formula

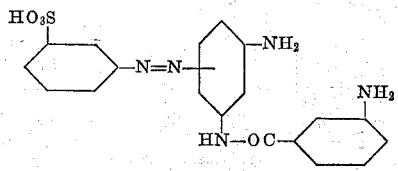

6. A water-soluble urea obtained by condensing with phosgene the aminoazo dyestuff of the formula

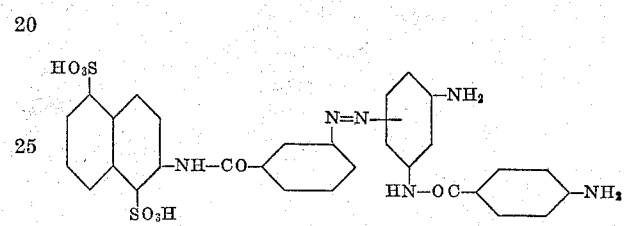

7. A water-soluble urea obtained by condensing with phosgene the aminoazo dyestuff of the formula

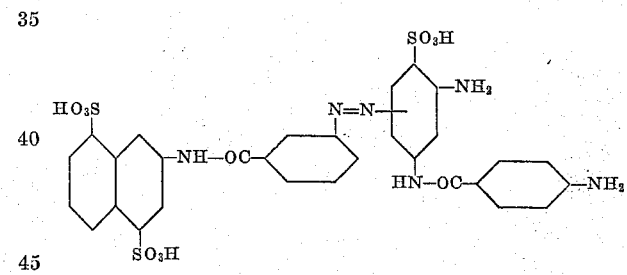

8. A water-soluble urea obtained by condensing with phosgene the aminazo dyestuff of the formula

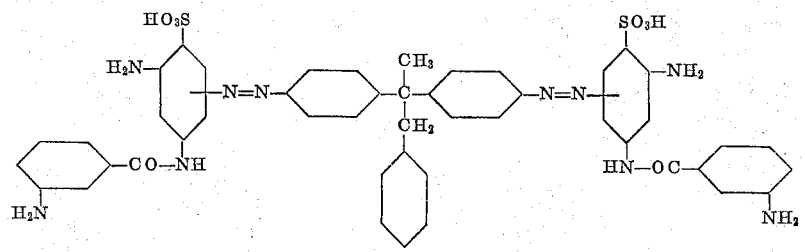

4. A water-soluble urea obtained by condensing with phosgene an amino azo dyestuff of the formula

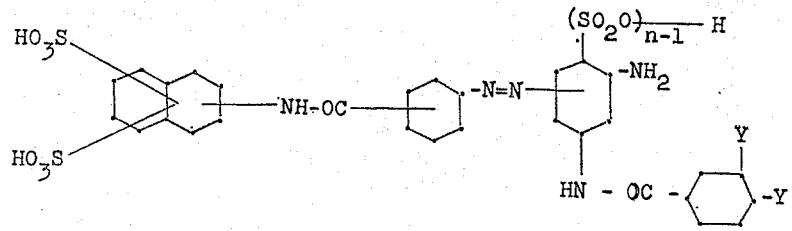

9. A water-soluble urea obtained by condensing with phosgene an amino azo dyestuff of the formula

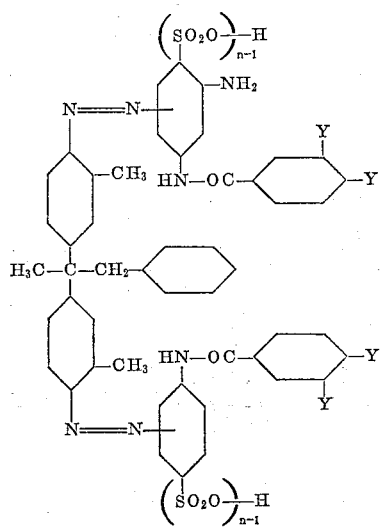

wherein one of the two Y's bound to the same benzene ring represents a hydrogen atom and the other of said two Y's represents an $H_2N-$ group and $n$ represents a whole number of at the most 2.

References Cited by the Examiner
UNITED STATES PATENTS

| | | | |
|---|---|---|---|
| 2,231,685 | 2/41 | Seymour | 96—20 |
| 2,470,769 | 5/49 | Gaspar | 260—144 |
| 2,681,856 | 6/54 | Gaspar et al. | 96—20 |
| 2,778,817 | 1/57 | Grandjeau | 260—207.1 |
| 2,795,577 | 6/57 | Feeman | 260—153 |
| 2,852,502 | 9/58 | Long et al. | 260—149 |
| 2,887,477 | 5/59 | Straley et al. | 260—149 |

CHARLES B. PARKER, *Primary Examiner.*

P. E. MANGAN, H. BURSTEIN, *Examiners.*